United States Patent [19]

Cray et al.

[11] Patent Number: 5,391,675
[45] Date of Patent: Feb. 21, 1995

[54] PROCESS FOR THE PREPARATION OF ORGANOPOLYSILOXANES

[75] Inventors: Steven E. Cray, Sully, Wales; Mubarik M. Chowdhry, London, United Kingdom

[73] Assignee: Dow Corning Limited, Barry, Wales

[21] Appl. No.: 251,495

[22] Filed: May 31, 1994

[30] Foreign Application Priority Data

Jun. 3, 1993 [GB] United Kingdom ............... 9311509

[51] Int. Cl.$^6$ ............................................. C08G 77/08
[52] U.S. Cl. ........................................ 528/14; 528/16; 528/23; 528/38
[58] Field of Search ............... 528/16, 23, 14, 38

[56] References Cited

U.S. PATENT DOCUMENTS 5,109,093  4/1992  Rees et al. ..................... 528/14

FOREIGN PATENT DOCUMENTS 942587    5/1961  United Kingdom.
2036052A  6/1980  United Kingdom ........ C08G 77/26

Primary Examiner—Melvyn I. Marquis
Attorney, Agent, or Firm—Robert L. McKeller

[57] ABSTRACT

A process for the preparation of amino-substituted organopolysiloxanes which comprises the steps of mixing a catalyst comprising both (i) at least one compound selected from barium hydroxide and strontium hydroxide and (ii) at least one compound selected from borates and phosphates of sodium with (A) a silanol terminated organopolysiloxane compound and (B) an organosilicon compound having at least one silicon-bonded alkoxy or alkoxyalkoxy group and a monovalent substituent composed of carbon, nitrogen and hydrogen and having at least one —$NH_2$ therein attached to silicon by way of a silicon to carbon linkage and thereafter allowing (A) and (B) to react at a temperature of at least 50° C.

12 Claims, No Drawings

PROCESS FOR THE PREPARATION OF ORGANOPOLYSILOXANES

This invention relates to a method for the preparation of organopolysiloxanes having silicon-bonded substituents containing amino groups.

Organosiloxane polymers having silicon-bonded aminoalkyl or polyaminoalkyl groups are known. They are employed inter alia as components of polish compositions and in the treatment of textile fibers to impart thereto properties such as softness and shrink resistance.

Polymers which may be used for such applications can be prepared from the appropriate cyclic siloxanes by an equilibration reaction. However, such a route results in the formation of a relatively high proportion of volatile compounds in the product rendering it less than satisfactory for some applications. Amino-containing siloxane polymers may also be obtained by reacting together an organosiloxane having silicon-bonded hydroxyl groups and a silane having silicon-bonded alkoxy groups and aminoalkyl or polyaminoalkyl groups, see for example British Patent 942 587. It was found, however, that when prepared by such a method the viscosity of the polymer increased during storage. A method of reducing the rate of increase in viscosity of such organosiloxanes is disclosed in GB 2 036 052 B wherein the hydroxylated siloxane and the amino-containing silane are reacted together in a specified range of proportions. Although a significant reduction in viscosity drift can be achieved according to the teaching of GB 2 036 052 B there has existed a need for further improvement in this respect.

E.P. 0 382 365 A2 discloses a process for the preparation of an organosilicon condensation product wherein there are reacted together in the presence of a catalytic substance selected from barium hydroxide and strontium hydroxide, an organosilicon compound having at least one silicon-bonded hydroxyl group and an organosilicon compound having at least one silicon-bonded —OX group in which X represents certain alkyl or alkoxyalkyl groups. Said EP also discloses that residual silanol groups in the condensation product can be condensed by subsequent contact with a second catalyst which may be a borate or phosphate of sodium or potassium. Although the said process can be employed for the preparation of amino-containing organopolysiloxanes it has been found that where the organosilicon compounds having at least one silicon-bonded OX group are silanes, the process yields by-products which are dimers of the silanes. Quite apart from the fact that the dimer material is an impurity and therefore needs to be removed from the reaction mixture, the organosilicon compound thus consumed cannot react with the organosilicon having at least one hydroxyl group and the yield of the desired condensation product is thereby reduced. Furthermore, a process involving the addition of a catalyst in two steps will involve the risk of error at each stage of addition; the risk of error is reduced if the catalyst is added in one step.

We have now found that by mixing together certain reactive organosilicon compounds and a catalyst comprising both at least one compound selected from strontium and barium hydroxide and at least one compound selected from borates and phosphates of sodium and thereafter reacting the mixture at a temperature of at least 50° C. we can produce a condensation product with reduced dimer formation.

According to the present invention there is provided a process for the preparation of organopolysiloxanes having silicon-bonded aminoalkyl or polyaminoalkyl groups which comprises mixing together and thereafter reacting at a temperature of at least 50° C. (A) a silanol terminated organopolysiloxane compound, (B) an organosilicon compound having at least one silicon-bonded group —OX wherein X is an alkyl group or an alkoxyalkyl group and having a monovalent group composed of carbon, hydrogen and nitrogen said monovalent group having at least one —$NH_2$ group therein and being attached to silicon by way of a silicon to carbon linkage, and (C) a catalyst comprising both (i) at least one compound selected from barium hydroxide and strontium hydroxide and (ii) at least one compound selected from borates and phosphates of sodium.

The organopolysiloxane compound (A) may be a polydiorganosiloxane according to the general formula $HOSiR_2(OSiR_2)_nOH$ wherein n is from 4 to 100, and R is an organic substituent selected from alkyl having 2 to 8 carbon atoms, for example, ethyl, propyl, pentyl and hexyl, alkenyl having from 2 to 6 carbon atoms, for example vinyl, allyl and hexenyl and phenyl. Preferably at least 80% of the total silicon-bonded substituents are methyl groups.

The organosilicon compound (B) employed in the process of this invention may be a silane or siloxane compound. A mixture of silanes, siloxanes or both may also be used. Preferred organosilicon compounds (B) are silanes represented by the general formula $CH_3(XO)_2SiY$ in which X represents, for example, methyl, ethyl, propyl, butyl, amyl and methoxyethyl and preferably represents methyl or ethyl. The substituent X is a monovalent group composed of carbon, hydrogen, nitrogen and, optionally, oxygen and is bonded to the silicon atom through a Si—C linkage. Provided at least one —$NH_2$ group is present in X any additional nitrogen may be present as, for example —NH— or —N—. Specific examples of X substituents are —$(CH_2)_3NH_2$, —$(CH_2)_4NH_2$, —$(CH_2)_3NH(CH_2)_2NH_2$, —$CH_2CH.CH_3CH_2NH(CH_2)_2NH_2$, —$(CH_2)_3NHCH_2CH_2NH(CH_2)_2NH_2$, —$(CH_2)_3NH(CH_2)_4NH_2$ and —$(CH_2)_3O(CH_2)_2NH_2$. Preferred as the X substituents are those which can be represented by the general formula —R'NHR" in which R' represents an alkylene group having 3 or 4 carbon atoms and R" represents a hydrogen atom or the group —$(CH_2)_2NH_2$.

The catalyst (C) comprises in combination (i) at least one compound selected from barium hydroxide and strontium hydroxide together with (ii) at least one compound selected from borates and phosphates of sodium. Specific examples of (ii) are $Na_2B_4O_7.4H_2O$, $NaBO_3.4H_2O$, $NaBO_2.xH_2O$ and $Na_3PO_4.12H_2O$. A preferred catalyst (C) is barium hydroxide in combination with trisodium phosphate ($Na_3PO_4.12H_2O$). The relative proportions of (i) and (ii) may be varied within wide limits, for example the ratio of (i) to (ii) may be from 1:9 to 9:1. Sufficient of (C) should be employed to provide by weight from about 0.01 to about 1%, preferably from 0.02 to 0.1%, of each of (i) and (ii) based on the combined weights of (A) and (B) in the reaction mixture.

In the performance of the process of this invention organopolysiloxane (A), organosilicon compound (B) and catalyst (C) are mixed together and (A) and (B) are allowed to react at a temperature of at least 50° C. The temperature at which the reaction is caused to proceed is not critical but having regard to the volatility of (B) and considerations of energy economy the temperature employed preferably does not exceed about 150° C. The reaction components may be mixed in any convenient order. Generally it is most practical to add the organosilicon compound (B) and the catalyst (C) to the organopolysiloxane (A) which may, if desired be preheated prior to such addition. The catalyst (C) may be incorporated with the other reactants in the form of a mixture of (i) and (ii). However, no advantage is apparent from such premixing and it is preferred to add (i) and (ii) individually and simultaneously to (A) or to a mixture of (A) and (B). Some delay between the incorporation of (i) and (ii) into the reaction mixture can be tolerated provided that the temperature of the mixture has not reached that at which significant reaction between (A) and (B) occurs. Typically the components (i) or (ii) or (i) and (ii) combined are added to the reaction mixture at a temperature of about 50° C. or below to about 95° C., e.g. 85° C.

The process of this invention is best performed under reduced pressure and with removal of water and alcohol by-products during the course of the reaction. When the desired degree of reaction has been achieved volatile substances may be removed from the product under reduced pressure.

In preparing organopolysiloxanes by the process of this invention the relative amounts of organopolysiloxane compound (A) and organosilicon compound (B) employed will depend on the desired content of amine-containing siloxane units in the product and on the relative molecular weights of (A) and (B). For most applications it is preferred that the reaction product contain from about 0.5 to 5 mol percent of such amine-containing units. In general therefore we prefer to carry out the reaction employing from about 1 to 10 parts by weight of organosilicon compound (B) per 100 parts by weight of (A).

Organopolysiloxanes prepared by the process of this invention find application in the variety of uses known for aminoalkyl- or polyaminoalkyl-siloxanes, for example as ingredients of polishes or for imparting softness or other desirable properties to textile fibers. They are characterised by the presence of reactive silicon-bonded alkoxy, alkoxyalkoxy or hydroxyl groups and may thus be crosslinked to elastomers by the addition of suitable organosilicone crosslinking agents and, where necessary, catalysts.

The invention is illustrated by the following Example in which the parts are expressed by weight, viscosity is given at 25° C. and Me and Et represent methyl and ethyl groups respectively.

Example 1

A polydimethylsiloxane (1) having terminal silanol groups and a viscosity of 72 cS, (72 mm$^2$/s) (953 g) was placed in a reaction flask fitted with a thermometer, stirrer and reflux condenser and heated to 85° C. To the polydimethylsiloxane was then added (EtO)$_2$MeSi(CH$_2$)$_3$NH$_2$ (47 g), Na$_3$PO$_4$ (0.25 g) and Ba(OH)$_2$.8H$_2$O (0.75 g). The stirred reaction mixture was refluxed for 2 hours at 85° C. under atmospheric pressure and then under reduced pressure (300 mbar) with removal of volatile by-products until a cooled sample of the product (25° C.) had a viscosity of 800 cS (800 mm$^2$/s).

The reaction mixture was then allowed to cool to 40° C. and a vacuum applied to remove remaining volatiles and leave a polydiorganosiloxane having the formula

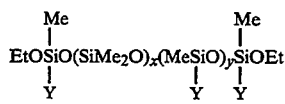

in which x=400, y=10 and Y represents the group CH$_2$CH$_2$CH$_2$NH$_2$, and having a viscosity of 2000 mm$^2$/s. No dimerised silane was present as determined by $^{29}$Si (70.4 MHz) nmr.

Comparative Example.

Polydiorganosiloxane as used in Example 1 (953 g) was placed in a reaction vessel fitted with a thermometer, stirrer and reflux condenser and was heated to a temperature of 85° C. (EtO)$_2$MeSi(CH$_2$)$_3$NH$_2$ (47 g) and Ba(OH)$_2$.8H$_2$O (0.75 g) were added to the polydiorganosiloxane (1) and the resultant mixture was stirred, at 85° C. for 2 hours at atmospheric pressure. Na$_3$PO$_4$ (0.25 g) was then added and, under reduced pressure (300 mbar) volatile by-products were removed until a cooled sample of the product (25° C.) showed a viscosity of 150 mm$^2$/s.

The reaction mixture was then allowed to cool to 40° C. and a vacuum applied to remove remaining volatiles.

The resultant polymer had a viscosity of 2000 mm$^2$s$^{-1}$. Dimerised silane was found to be present at a level of 0.1 mol %, That which is claimed is:

1. A process for the preparation of organopolysiloxanes having silicon-bonded substituents selected from the group consisting of aminoalkyl and polyaminoalkyl which comprises mixing together and thereafter reacting at a temperature of at least 50° C. (A) a silanol endblocked organopolysiloxane, (B) an organosilicon compound having at least one silicon-bonded group —OX wherein X is selected from the group consisting of alkyl and alkoxyalkyl and having a monovalent group composed of carbon, hydrogen and nitrogen said monovalent group having at least one —NH$_2$ group therein and being attached to silicon by way of a silicon to carbon linkage, and (C) a catalyst comprising both (i) at least one compound selected from the group consisting of barium hydroxide and strontium hydroxide and (ii) at least one compound selected from the group consisting of borates and phosphates of sodium.

2. A process according to Claim 1 wherein (i) and (ii) are each employed in an amount of from 0.01 to 1.0% by weight based on the combined weights of (A) and (B).

3. A process according to Claim 1 wherein (A), (B) and (C) are reacted at a temperature of from 50° to 150° C.

4. A process according to Claim 1 wherein the organopolysiloxane (A) is a polydiorganosiloxane according to the general formula HOSiR$_2$(OSiR$_2$)$_n$OH wherein n has a value from 4 to 100 and R is selected from the group consisting of alkyl having from 2 to 8 carbon atoms, alkenyl having from 2 to 6 carbon atoms and phenyl.

5. A process according to Claim 4 wherein at least 80% of the R groups in polydiorganosiloxane (A) are methyl groups.

6. A process according to Claim 1 wherein the organosilicon compound (B) is a silane according to the formula $CH_3(OX)_2SiY$ wherein each X is selected from the group consisting of alkyl and alkoxyalkyl and Y represents a monovalent group composed of carbon, hydrogen and nitrogen, said Y group having at least one $-NH_2$ group therein and being attached to silicon by way of a silicon-to-carbon linkage.

7. A process according to Claim 1 wherein the catalyst (C) consists of barium hydroxide in combination with trisodium phosphate.

8. A process according to Claim 7 wherein barium hydroxide (i) and trisodium phosphate (ii) are each employed in an amount of from 0.01 to 1.0% by weight based on the combined weights of (A) and (B).

9. A process according to Claim 7 wherein (A), (B) and (C) are reacted at a temperature of from 50° to 150° C.

10. A process according to Claim 7 wherein the organopolysiloxane (A) is a polydiorganosiloxane according to the general formula $HOSiR_2(OSiR_2)_nOH$ wherein n has a value from 4 to 100 and R is selected from the group consisting of alkyl having from 2 to 8 carbon atoms, alkenyl having from 2 to 6 carbon atoms and phenyl.

11. A process according to Claim 10 wherein at least 80% of the R groups in polydiorganosiloxane (A) are methyl groups.

12. A process according to Claim 7 wherein the organosilicon compound (B) is a silane according to the formula $CH_3(OX)_2SiY$ wherein each X is selected from the group consisting of alkyl and alkoxyalkyl and Y represents a monovalent group composed of carbon, hydrogen and nitrogen, said Y group having at least one $-NH_2$ group therein and being attached to silicon by way of a silicon-to-carbon linkage.

* * * * *